United States Patent
Panec et al.

(10) Patent No.: US 10,481,680 B2
(45) Date of Patent: Nov. 19, 2019

(54) SYSTEMS AND METHODS TO PROVIDE A SHARED AUGMENTED REALITY EXPERIENCE

(71) Applicant: Disney Enterprises, Inc., Burbank, CA (US)

(72) Inventors: Timothy Panec, Studio City, CA (US); Elliott Baumbach, Porter Ranch, CA (US); Michael P. Goslin, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 111 days.

(21) Appl. No.: 15/887,085

(22) Filed: Feb. 2, 2018

(65) Prior Publication Data
US 2019/0243446 A1 Aug. 8, 2019

(51) Int. Cl.
*G06F 3/01* (2006.01)
*G06F 3/14* (2006.01)
*G06T 19/00* (2011.01)
*G06K 9/00* (2006.01)

(52) U.S. Cl.
CPC ............ *G06F 3/012* (2013.01); *G06F 3/1454* (2013.01); *G06K 9/00671* (2013.01); *G06T 19/006* (2013.01)

(58) Field of Classification Search
CPC ... G06F 3/012; G06F 3/1454; G06K 9/00671; G06T 19/006
See application file for complete search history.

(56) References Cited

U.S. PATENT DOCUMENTS

| | | | |
|---|---|---|---|
| 6,162,123 A | 12/2000 | Woolston | |
| 7,719,563 B2 | 5/2010 | Richards | |
| 10,300,372 B2 | 5/2019 | Goslin | |
| 10,304,251 B2 | 5/2019 | Pahud | |
| 2007/0126700 A1 | 6/2007 | Wright | |

(Continued)

OTHER PUBLICATIONS

Dictionary.com, Defintion of lightsaber, 2019, Dictionary.com, pp. 1-2 (Year: 2019).

(Continued)

*Primary Examiner* — Charles V Hicks
(74) *Attorney, Agent, or Firm* — Esplin & Associates, PC

(57) ABSTRACT

This disclosure relates to providing users with a shared augmented reality experience. Head-mounted devices are provided with the shared-augmented reality experience. The shared augmented reality experience may be provided to individual head-mounted devices based on sensor information conveyed by output signals of a sensor set of the individual head-mounted devices. The sensor set of the individual head-mounted devices have different reference frames. Discrepancies between the sensor set of the individual head-mounted devices may cause the shared-augmented reality experience to be presented with different perspectives. The individual head-mounted devices may have different perspectives of the shared-augmented reality experience caused by discrepancies between the sensor set of the individual head-mounted devices. The discrepancies between the sensor set of the individual head-mounted devices may be determined such that the shared-augmented reality experience is presented along a same or similar perspective.

20 Claims, 5 Drawing Sheets

(56) References Cited

U.S. PATENT DOCUMENTS

| | | |
|---|---|---|
| 2007/0252815 A1 | 11/2007 | Kuo |
| 2010/0261526 A1 | 10/2010 | Anderson |
| 2011/0250962 A1 | 10/2011 | Feiner |
| 2012/0050535 A1 | 3/2012 | Densham |
| 2012/0262365 A1 | 10/2012 | Mallinson |
| 2012/0327117 A1 | 12/2012 | Weller |
| 2013/0042296 A1 | 2/2013 | Hastings |
| 2013/0044128 A1 | 2/2013 | Liu |
| 2013/0229396 A1 | 9/2013 | Huebner |
| 2013/0286004 A1 | 10/2013 | Mcculloch |
| 2014/0002329 A1 | 1/2014 | Nishimaki |
| 2014/0003651 A1 | 1/2014 | Smoot |
| 2014/0078517 A1 | 3/2014 | Ben-Yishai |
| 2014/0080109 A1 | 3/2014 | Haseltine |
| 2014/0104169 A1 | 4/2014 | Masselli |
| 2015/0035677 A1 | 2/2015 | Williams |
| 2015/0201188 A1 | 7/2015 | Pritch |
| 2015/0243286 A1 | 8/2015 | Goslin |
| 2015/0248785 A1 | 9/2015 | Holmquist |
| 2016/0189411 A1 | 6/2016 | Matsunaga |
| 2016/0206957 A1 | 7/2016 | Goslin |
| 2016/0253842 A1 | 9/2016 | Shapira |
| 2016/0260261 A1 | 9/2016 | Hsu |
| 2016/0274662 A1 | 9/2016 | Rimon |
| 2016/0299563 A1 | 10/2016 | Stafford |
| 2016/0327798 A1 | 11/2016 | Xiao |
| 2017/0087465 A1 | 3/2017 | Lyons |
| 2017/0124713 A1 | 5/2017 | Jurgenson |
| 2017/0132841 A1 | 5/2017 | Morrison |
| 2017/0161561 A1 | 6/2017 | Marty |
| 2017/0203225 A1 | 7/2017 | Goslin |
| 2017/0213387 A1 | 7/2017 | Bean |
| 2017/0295229 A1 * | 10/2017 | Shams ............... H04L 67/1095 |
| 2018/0081439 A1 | 3/2018 | Daniels |
| 2018/0173300 A1 | 6/2018 | Schwarz |
| 2018/0190017 A1 | 7/2018 | Mendez |
| 2018/0204362 A1 | 7/2018 | Tinsman |
| 2018/0295324 A1 | 10/2018 | Clark |
| 2018/0350056 A1 | 12/2018 | Cardenas Bernal |
| 2018/0365893 A1 | 12/2018 | Mullins |
| 2019/0019346 A1 | 1/2019 | Cuthbertson |

OTHER PUBLICATIONS

Virtual and Augmented Reality, Oct. 2016, Citi GPS: Global Perspectives & Solutions. (128 pages).

* cited by examiner

SYSTEMS AND METHODS TO PROVIDE A SHARED AUGMENTED REALITY EXPERIENCE

FIELD OF THE DISCLOSURE

The present disclosure relates to providing users with a shared augmented reality experience.

BACKGROUND

Augmented reality involves presenting virtual content. The virtual content may be presented through smartphones, head-mounted devices, personal computers, and/or other client computing devices. Users may experience augmented reality through their client computing devices. The virtual content is presented such that the virtual content appears to reside in a real-world environment.

SUMMARY

One aspect of this disclosure relates to providing users with a shared augmented reality experience. One or more of a first user of a first head-mounted device, a second user of a second head-mounted device, and/or other users of other head-mounted devices may be provided with the shared-augmented reality experience. The shared augmented reality experience may be presented through the first head-mounted device based on a first heading conveyed by a first heading sensor of the first head-mounted device and/or other information. The shared augmented reality experience may be presented to the second head-mounted device based on a second heading conveyed by a second heading sensor of the second head-mounted device and/or other information. The first heading sensor and the second heading sensor may be calibrated along different reference frames. The first head-mounted device may determine its position in a real-world environment based on one or more reference points within a field of view of a first sensor set. The second head-mounted device may determine its position in the real-world environment based on the one or more reference points within a field of view of a second sensor set. The first head-mounted device may determine a calculated heading of the first heading sensor. The calculated heading may be a heading conveyed by the first heading sensor when the first head-mounted device is at a position of the second head-mounted device in the real-world environment when two common reference points are visible. The first head-mounted device may determine its position relative to the position of the second head-mounted device based on the two common reference points. A heading difference may be determined based on a comparison between the calculated heading and the second heading.

The arrangement of the shared-augmented reality experience effectuated through the first head-mounted device may be based on the first heading, and/or other information. The arrangement of the shared-augmented reality experience effectuated through the second head-mounted device may be based on the second heading modified by the heading difference, and/or other information. The second heading may be modified by the heading difference such that the shared-augmented reality experience presented to the second head-mounted device may be in a shared relative perspective. The shared relative perspective being a perspective shared between the first head-mounted device and the second head-mounted device. The shared relative perspective may be with respect to a first reference frame of the first head-mounted device. In some implementations, in the shared relative perceptive, augmented reality content may be perceived by a first user through the first head-mounted device to be in a given position and given heading, and the augmented reality content may be perceived by a second user through the second head-mounted device to also be in the given position and given heading. For example, if an augmented reality content forming a human-like figure is standing in front of and facing the first user from a perceptive of the first user, the second user may also see the human-like figure also standing in front of and facing the first user from a perceptive of the second user.

A system for providing users with a shared augmented reality experience may include one or more of the one or more head-mounted devices, one or more external resources, and/or other components. The head-mounted device(s) may include one or more of a sensor set, a client computing device(s), and/or other components. In some implementations, the head-mounted device(s) may be installed (e.g., mounted) on the head of a user. The head-mounted device(s) may include individual heading mounted devices. The individual head-mounted devices may include a first head-mounted device, a second head-mounted device, and/or other head-mounted devices. The first head-mounted device may be separate and distinct from the second head-mounted device. The first head-mounted device may be configured to communicate with the second head-mounted device and/or other head-mounted devices according to a client/server architecture and/or other communication schemes.

In some implementations, a sensor set of a given head-mounted device may include one or more sensors. The one or more sensors may include one or more of one or more image sensors, one or more audio sensors, one or more geo-location sensors, one or more heading sensors, one or more proximity sensors, and/or other sensors.

In some implementations, the client computing device(s) may include one or more physical processors, and/or other components. The one or more physical processors may be configured by machine-readable instructions. Executing the machine-readable instructions may cause the client computing device(s) to provide the users with a shared augmented reality experience. The machine-readable instructions may include one or more computer program components. The computer program components may include one or more of an image processing component, a heading component, a determination component, a presentation component, and/or other components.

In some implementations, the image processing component may be configured to obtain information from the one or more sensors, and/or other components. In some implementations, the image processing component may be configured to obtain information generated by a sensor set, and/or other components. In some implementations, the image processing component may be configured to obtain information conveyed by output signals generated by one or more of the one or more image sensors, the one or more proximity sensors, and/or other sensors. In some implementations, the image processing component may be configured to obtain information from other client computing devices, and/or other head-mounted devices. In some implementations, the image processing component may be configured to obtain information generated by one or more sensors of the other client computing devices, and/or other head-mounted devices. In some implementations, the image processing component may be configured to obtain visual information conveyed by output signals of an image sensor, and/or other devices. In some implementations, the image processing component may be configured to obtain range information conveyed by one or more sensors, and/or other devices.

In some implementations, the visual information may define visual content. The visual content defined by the visual information may include one or more reference points physically present in the real world, and/or other content. In some implementations, the one or more reference points may be one or more electromagnetic radiation beacons. The electromagnetic radiation beacons may include one or more of light beacons, infrared beacons, and/or other devices.

In some implementations, the heading component may be configured to obtain heading information conveyed by output signals of a heading sensor, and/or other information. The heading information may convey headings of the client computing device(s). The heading information may convey a heading with respect to a reference frame of the heading sensor. For example, first heading information conveyed by output signals of a first heading sensor of a first client computing device may define a first heading with respect to a first reference frame. Second heading information conveyed by output signals of a second heading sensor of a second client computing device may define a second heading with respect to a second reference frame.

In some implementations, the determination component may be configured to determine discrepancies between the reference frames of heading sensors of individual client computing devices. In some implementations, the determination component may be configured to determine positions of the client computing device(s) in the real-world environment. The positions of the client computing device(s) in the real-world environment may be relative to the one or more reference points in the real-world environment. The positions of the client computing device(s) in the real-world environment may include the headings of the individual client computing devices with respect to the one or more reference points. The one or more reference points may include a set of two common reference points.

In some implementations, the determination component may be configured to determine a calculated heading of the first heading of the first heading sensor. The calculated heading may be a heading of the first heading sensor when the first head-mounted device is at the position of the second head-mounted device relative to the one or more reference points. A comparison between the calculated heading and the heading of the second heading sensor may provide a technique to check for a discrepancy between the reference frames of the first heading sensor and the second heading sensor. For example, if the calculated heading and the second heading differ, then that difference may be the discrepancy between the reference frames of the two heading sensors. In some implementations, the determination component may determine the position of the first head-mounted device relative to the position of the second head-mounted device based on the one or more reference points. The first head-mounted device may obtain position information from the second head-mounted device and/or other head-mounted devices. The position information may define the position and/or heading of the other client computing devices.

In some implementations, the determination component may determine a heading difference. The determination component may compare the calculated heading with the second heading to determine the heading difference. The heading difference may convey a discrepancy between the first heading sensor and the second heading sensor at the same heading. The heading difference may convey a discrepancy between the first reference frame and the second reference frame.

In some implementations, the presentation component may be configured to effectuate presentation of the shared-augmented reality experience. In some implementations, the presentation component may effectuate presentation of shared augmented reality content of the shared-augmented reality experience. In some implementations, the presentation component may effectuate presentation of the shared augmented reality content through the client computing device(s), and/or other devices. In some implementations, the presentation component may effectuate presentation of the shared augmented reality content through the first client computing device, the second client computing device, and/or other client computing devices. The shared augmented reality content may be presented through the first client computing device may be arranged based on the first heading, and/or other information. The shared augmented reality content may be presented through the second client computing device may be arranged based on the second heading modified by the heading difference, and/or other information. The shared augmented reality content may be presented to the client computing device(s) with respect to the one or more reference points.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 4 illustrates the first user with the first head-mounted device and the second user with the second head-mounted device seeing the same augmented reality content after the discrepancy between the sensors of the first head-mounted device and sensors of the second head-mounted device have been compensated for.

DETAILED DESCRIPTION

Figure 1:
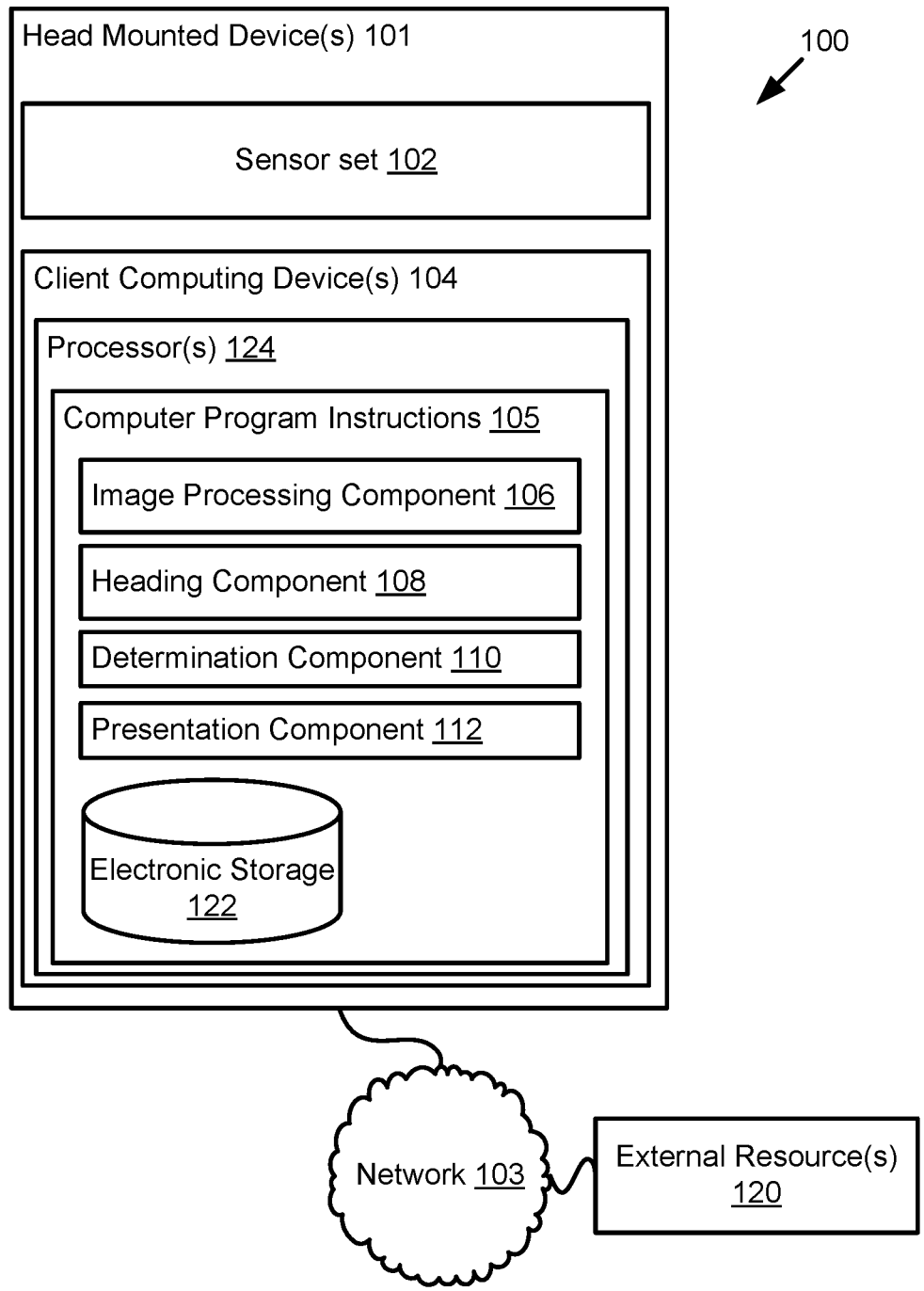
FIG. 1 illustrates a system for providing users with shared augmented reality experiences, in accordance with one or more implementations.

FIG. 1 illustrates a system 100 configured to provide users with a shared augmented reality experience. In some implementations, the shared-augmented reality experience may include providing one or more head-mounted devices 101 with shared augmented reality content. The shared augmented reality content may be accessed by individual head-mounted devices contemporaneously. The individual head-mounted devices of head-mounted device(s) 101 may include one or more of a first head-mounted device, a second head-mounted device, and/or other head-mounted devices. The first head-mounted device may be separate and distinct from the second head-mounted device. The first head-mounted device and the second head-mounted device may have the same or similar components and/or the same and/or similar functionality as described herein for head-mounted device(s) 101. The first head-mounted device may be configured to communicate with the second head-mounted device and/or other head-mounted devices according to a client/server architecture and/or other communication schemes.

As is illustrated in FIG. 1, system 100 may include one or more of the one or more head-mounted devices 101, one or more external resources 120, and/or other components. Individual users of system 100 may access system 100 via individual ones of head-mounted device(s) 101. Head-mounted device(s) 101 may include one or more of a sensor set 102, client computing device(s) 104, and/or other components. In some implementations, head-mounted device(s) 101 may be installed (e.g., mounted) on the head of a user.

In some implementations, a repository of information defining augmented reality content may be available via system 100 and/or client computing device(s) 104. The augmented reality content may be stored in electronic storage 122, non-transitory storage media, and/or other storage media. The repository of the augmented reality content may be a data structure configured to store information defining the augmented reality content. The repository of the augmented reality content may comprise a computer-readable medium. In some implementations, a data structure configured to store information defining the augmented reality content may store executable instructions (e.g., programming code) that may be configured to generate views of the augmented reality content. The data structure configured to store information defining the augmented reality content may be a single database or multiple databases. In some implementations, different executable instructions stored in the data structure may perform different functions. In some implementations, the augmented reality content may be the shared-augmented reality content, and/or other contents. The augmented reality content may include one or more virtual entities, virtual objects, and/or other augmented reality content.

In some implementations, sensor set 102 may include one or more sensors. The one or more sensors may include one or more of one or more image sensors, one or more audio sensors, one or more geo-location sensors, one or more heading sensors, one or more proximity sensors, and/or other sensors.

In some implementations, an image sensor may be configured to generate output signals conveying visual information. The visual information may define visual content within a field of view of the image sensor. The visual content may include depictions of real-world objects and/or surfaces. The visual information may be in the form of one or more of images, videos, and/or other visual information. The field of view of the image sensor may be a function of a position and an orientation of a client computing device. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices.

In some implementations, an audio sensor may be configured to generate output signals conveying audio information. The audio information may include audio information from a user of the audio sensor (e.g., utterances of the user), and/or audio information around the user (such as ambient audio). In some implementations, an audio sensor may include one or more of a microphone, a micro-electro-mechanical microphone, and/or other devices.

In some implementations, a geo-location sensor may be configured to generate output signals conveying location information and/or other information. The location information may include one or more real-world locations of the location sensor. In some implementations, the geo-location sensor may comprise one or more of a Global Positioning Systems (GPS), Satellite Navigation Systems (satnav), and/or other positioning systems configured to generate output signals conveying location, and/or other information. In some implementations, the geo-location sensor may communicate with remote wireless devices configured to generate output signals conveying location, and/or other information. By way of non-limiting example, the geo-location sensor may communicate with the remote wireless device through one or more electromagnetic signals. The one or more electromagnetic signals may include one or more of a Bluetooth signal, Wi-fi, Li-fi, radio signal, and/or other electromagnetic signals. The remote wireless device may generate output signals conveying the location of the computing platform by comparing one or more signal strengths between the remote wireless device and the geo-location sensor. The one or more comparison of the signal strengths may be used to triangulate the position of the remote wireless device relative to the wireless device, and/or other devices.

In some implementations, a heading sensor may be configured to generate output signals conveying heading information. The heading information may convey heading of the heading sensor. Heading may be specified with respect to one or more degrees of freedom. By way of non-limiting illustration, the heading may include measurements such as yaw, roll, pitch, and/or other information. The heading sensor may include one or more of an accelerometer, gyroscope, inertial measurement unit, Global Positioning Systems (GPS), Satellite Navigation Systems (satnav), and/or other systems for conveying the heading information.

In some implementations, a proximity sensor may be configured to generate output signals conveying range information. The range information may define a distance between the proximity sensor and one or more objects. The proximity sensor may include one or more of a radar, an ultrasonic transducer, a sonar, optics, laser rangefinder, thermal infrared rangefinder, and/or other proximity sensors. In some implementations, range information may be determined from visual information conveyed by output signals of an image sensor. By way of non-limiting illustration, one or more image processing techniques may be employed to determine range information from images. By way of non-limiting illustration, an image-processing technique may include bundle adjustment and/or other techniques.

In some implementations, client computing device(s) 104 may include one or more physical processors 124, and/or other components. The one or more physical processors 124 may be configured by machine-readable instructions 105. Executing machine-readable instructions 105 may cause client computing device(s) 104 to provide users with a shared augmented reality experience. Machine-readable instructions 105 may include one or more computer program components. In some implementations, the computer program components may be configured to enable a user associated with the client computing device(s) 104 to interface with system 100, head-mounted device 101, the one or more sensors, and/or external resources 120, and/or provide other functionality attributed herein to client computing device(s) 104 and/or head-mounted device(s) 101. The computer program components may include one or more of an image processing component 106, a heading component 108, a determination component 110, a presentation component 112, and/or other components.

In some implementations, client computing device(s) 104 may be one or more of a computing device, a mobile computing device, and/or other computing platforms. In some implementations, client computing device(s) 104 may be removably coupled to head-mounted device(s) 101. Client computing device(s) 104 may function independently from head-mounted device(s) 101. Client computing device(s) 104 may be removably coupled to other head-mounted devices. In some implementations, one or more sensors of sensor set 102 may be carried by client computing device(s) 104.

In some implementations, individual sensors of the individual client computing devices may be calibrated differently. In some implementations, the difference in calibration may cause discrepancies between the conveyed heading to differ even if two different heading sensors have the same heading in the real-world environment. The discrepancies between the individual sensors coupled to the individual client computing devices may create discrepancies between the arrangement of the shared-augmented reality content presented to the individual client computing devices. System 100 may determine the discrepancies between the individual heading sensors and/or other sensors. One client computing device may act as a host and determine discrepancies with individual ones of the other client computing devices. The determined discrepancies between the individual sensors of the individual client computing devices may be used to adjust the arrangement of the shared-augmented reality content presented through the individual client computing devices. The arrangement of the shared-augmented reality content presented through the individual client computing devices may be adjusted such that the individual client computing devices may have a similar augmented reality experience. In some implementations, the similar augmented reality experiences may include the first user and the second user experiencing the same augmented reality content in a shared relative perspective. For example, if an augmented reality content forming a human-like figure is standing in front of the first user and interacting with the first user, then the second user standing to the side of the human-like figure may see the side of the human-like figure, and the human-like figure is interacting with the first user.

In some implementations, image processing component 106 may be configured to obtain information from individual sensors of sensor set 102, and/or other components. In some implementations, image processing component 106 may be configured to obtain information conveyed by output signals generated by one or more of the one or more image sensors, the one or more proximity sensors, and/or other sensors. In some implementations, image processing component 106 may be configured to obtain information from other client computing devices, and/or other head-mounted devices. In some implementations, image processing component 106 may be configured to obtain information conveyed by output signals generated by one or more sensors of the other client computing devices, and/or other head-mounted devices.

In some implementations, image processing component 106 may be configured to obtain visual information conveyed by output signals of an image sensor, and/or other information. In some implementations, the visual information may be conveyed by output signals generated by a stereo pair of image sensors. The visual information conveyed by output signals of a stereo pair of image sensors may include first visual information conveyed by output signals generated by a first image sensor, second visual information conveyed by output signals generated by a second image sensor, and/or other information. In some implementations, the output signals conveying the first visual information and the second visual information may be generated contemporaneously by the first image sensor and the second image sensor, respectively. In some implementations, the output signals conveying the first visual information and the second visual information may be generated at different points in time by the first image sensor and the second image sensor. In some implementations, the first visual information and second visual information may define visual content within a field of view of the respective image sensors. In some implementations, the one or more image sensors may be coupled to head-mounted device(s) 101, and/or other components of head-mounted device(s) 101.

In some implementations, the visual content within the field of view of the one or more image sensors may include depictions of one or more reference points and/or other content. In some implementations, the one or more reference points may be one or more electromagnetic radiation beacons. The one or more electromagnetic radiation beacons may include one or more of light beacons, infrared beacons, and/or other devices. In some implementations, the electromagnetic radiation beacons may be in the real-world environment. In some implementations, the electromagnetic radiation beacons may be in proximity to head-mounted device(s) 101, and/or other devices. By way of non-limiting example, the beacons may be placed throughout a room in which users may be sharing the augmented reality experience.

In some implementations, the electromagnetic radiation beacons may include one or more of a first beacon, a second beacon, and/or other beacons. The first beacon, the second beacon, and/or other beacons may be in proximity to head-mounted device(s) 101 in the real-world environment. The first beacon, the second beacon, and/or other beacons may be positioned in proximity to one another. The first beacon, the second beacon, and/or other beacons may be positioned in proximity to one another such that the first beacon, the second beacon, and/or other beacons stay within the field of view of the image sensors. For example, if the maximum field of view of the image sensor may be about 110 degrees, the first beacon, the second beacon, and/or other beacons may be positioned in proximity to one another such that they are within the 110 degrees field of view of the image sensor. In some implementations, the first beacon, the second beacon, and/or other beacons may be positioned along a horizontal axis, a vertical axis, and/or in other positions relative to, and in proximity of one another. In some implementations, the first beacon, the second beacon, and/or other beacons may be positioned side by side relative to one another. In some implementations, the first beacon, the second beacon, and/or other beacons may be 1 meter to 10 meters away from one another. In some implementations, the first beacon, the second beacon, and/or other beacons may be 2 meters to 8 meters away from one another. In some implementations, the first beacon, the second beacon, and/or other beacons may be 4 meters to 6 meters away from one another. In some implementations, the first beacon, the second beacon, and/or other beacons may be 3 meters to 4 meters away from one another. In some implementations, the first beacon, the second beacon, and/or other beacons may be 5 meters to 6 meters away from one another. In some implementations, if the maximum field of view of the image sensor may be about 110 degrees, the first beacon, the second beacon, and/or other beacons may be 5 meters to 6 meters away from one another.

In some implementations, the visual content within the field of view of the one or more image sensors may include depictions of the first beacon, the second beacon, and/or other beacons. In some implementations, the visual content within the field of view of the one or more image sensors may include the first beacon, the second beacon, and/or other beacons contemporaneously. In some implementations, the visual content within the field of view of the one or more image sensors may include the first beacon, the second beacon, and/or other beacons at different points in time.

In some implementations, image processing component 106 may be configured to obtain visual information from other client computing devices, and/or other head-mounted devices. In some implementations, the visual information conveyed by output signals of an image sensor obtained from the other client computing devices may define visual content within fields of view of one or more image sensors of the other client computing devices. In some implementations, the visual content within the field of view of the one or more image sensors of the other computing device may include depictions of the one or more reference points and/or other content.

In some implementations, image processing component 106 may be configured to obtain range information and/or other information. In some implementations, the range information may be conveyed by output signals generated the one or more proximity sensors, the one or more image sensors, and/or other sensors. In some implementations, range information may be determined from visual information conveyed by output signals of the one or more image sensors. By way of non-limiting illustration, one or more image processing techniques may be employed to determine range information from the visual information. The one or more image-processing techniques may include one or more of bundle adjustment, SURF (Speeded-Up Robust Features), ORB (Oriented BRIEF), computer vision, and/or other techniques.

In some implementations, the first beacon, the second beacon, and/or other beacons may be within the field of view of the one or more proximity sensors. In some implementations, the first beacon, the second beacon, and/or other beacons may be within the field of view of the one or more proximity sensors contemporaneously. In some implementations, the first beacon, the second beacon, and/or other beacons may be within the field of view of the one or more proximity sensors at different points in time.

In some implementations, the range information may define ranges, and/or other information. In some implementations, the range information may define ranges between the one or more proximity sensors and objects within the field of view of the one or more proximity sensors. In some implementations, the range information may define ranges between head-mounted device(s) 101 and objects within the field of view of the one or more proximity sensors. In some implementations, the range information may define ranges between the one or more proximity sensors and the one or more reference points. In some implementations, the range information may define ranges between head-mounted device(s) 101 and the one or more reference points. In some implementations, the range information may define a first range between the one or more proximity sensors and the first beacon, a second range between the one or more proximity sensors and the second beacon, and/or other ranges between the one or more proximity sensors and other beacons. In some implementations, the range information may be determined from the visual information conveyed by output signals of a stereo pair of image sensors by determination component 110, and/or other components.

In some implementations, heading component 108 may be configured to obtain information conveyed by output signals generated by the one or more sensors of sensor set 102, and/or other components. In some implementations, heading component 108 may be configured to obtain information conveyed by output signals generated by one or more heading sensors of sensor set 102, and/or other sensors. In some implementations, heading component 108 may be configured to obtain information from other client computing devices, and/or other head-mounted devices.

In some implementations, heading component 108 may be configured to obtain heading information conveyed by the output signals of a heading sensor, and/or other information. The heading information may convey a heading with respect to a reference frame of the heading sensor. For example, the first heading information conveyed by output signals of a first heading sensor of a first client computing device may define a first heading with respect to a first reference frame. Second heading information conveyed by output signals of a second heading sensor of a second client computing device may define a second heading with respect to a second reference frame.

In some implementations, heading component 108 may be configured to obtain heading information conveyed by the output signals generated the one or more heading sensors coupled to client computing device(s) 104. In some implementations, heading component 108 may be configured to obtain heading information conveyed by the output signals generated the one or more heading sensors coupled to the other client computing devices.

In some implementations, the heading information conveyed by the output signals generated by a heading sensor and/or other sensors of client computing device(s) 104 may define a heading of client computing device(s) 104, and/or other information. The heading information may define the heading of client computing device(s) 104 with respect to the reference frame of the heading sensor client computing device(s) 104. The heading of client computing device(s) 104 with respect to the reference frame may be referred to as a first heading. The reference frame of the heading sensor of client computing device(s) 104 may be referred to as a first reference frame.

In some implementations, the heading information conveyed by the output signals generated a heading sensor of another computing device may define a heading of the other computing device, and/or other information. The heading information may define the heading of the other computing device with respect to a reference frame of the heading sensor of the other computing device. The heading of the other computing device with respect to the reference frame of the other computing device may be referred to as a second heading. The reference frame of the other computing device may be referred to as a second reference frame. The first reference frame and the second reference frame may be different reference frames. The difference may exist by virtue of the first heading sensor and the second heading sensor being calibrated differently.

In some implementations, determination component 110 may be configured to determine discrepancies between the reference frames of the individual heading sensors of the individual client computing devices. In some implementations, determination component 110 may determine the discrepancies by comparing the actual headings of the individual heading sensors of the individual client computing devices with calculated headings. Determination component 110 may compare the actual headings of the individual heading sensors of the individual client computing devices at given positions of the heading sensors with calculated headings determined also at those given positions but with respect to a reference frame of a heading sensor of a head-mounted device acting as a host. The given position in the real-world environment may be relative to the one or more reference points.

In some implementations, determination component 110 may be configured to determine positions of head-mounted device(s) 101 in the real-world environment. The positions of head-mounted device(s) 101 in the real-world environment may be with respect to the one or more reference points. The one or more reference points may include a set of two common reference points. The positions of head-mounted device(s) 101 in the real-world environment may include headings of head-mounted device(s) 101 with respect to the one or more reference points.

In some implementations, determination component 110 may be configured to determine the position of head-mounted device(s) 101 relative to the one or more reference points based a geometric relationship between the one or more reference points and the head-mounted device(s) 101. The geometric relationship between the one or more reference points and the head-mounted device(s) 101 may include one or more distances between individual reference points, distances between individual reference points and head-mounted device(s) 101, directions between individual reference points and head-mounted device(s) 101, and/or other geometric relationship. In some implementations, the geometric relationship between the one or more reference points and the head-mounted device(s) 101 may be determined from the visual information, the range information, and/or other information.

In some implementations, the geometric relationship between the one or more reference points and the head-mounted device(s) 101 may be determined from the visual information, the range information, and/or other information through one or more mathematical techniques. The one or more mathematical techniques may include mathematical calculations, geometric considerations, and/or other mathematical techniques. For example, determination component 110 may use the Pythagorean theorem and/or other geometry techniques. In some implementations, the geometric relationship between the one or more reference points and the head-mounted device(s) 101 may be determined through one or more image processing techniques, and/or other techniques.

In some implementations, determination component 110 may be configured to determine distances between the one or more reference points, and/or other information. In some implementations, determination component 110 may be configured to determine distances between the one or more reference points from the visual information, the range information, and/or other information. Determination component 110 may be configured to determine distances between the one or more reference points within the visual content defined by the visual information. In some implementations, the distances between the one or more reference points within the visual content may be determined by measuring pixel distance between the one or more reference points within the visual content. In some implementations, determination component 110 may be configured to measure the pixel distance between the one or more reference points within the visual content. For example, determination component 110 may determine a distance between the first beacon and the second beacon within the visual content defined by the visual information. Determination component 110 may measure the pixel distance between the first beacon and the second beacon within the visual content to determine the distance between the first beacon and the second beacon.

In some implementations, determination component 110 may be configured to determine distances between the one or more reference points from the range information and/or other information. Based on the ranges between head-mounted device(s) 101 and the one or more reference points defined by the range information, determination component 110 may determine distances between the one or more reference points using the one or more mathematical techniques, and/or other techniques. In some implementations, based on the ranges between head-mounted device(s) 101 and the one or more reference points, determination component 110 may use the geometric relationships to determine the distances between the one or more reference points. In some implementations, based on the ranges between head-mounted device(s) 101 and the one or more reference points, determination component 110 may apply the Pythagorean theorem to determine the distances between the one or more reference points. For example, based on the range between the head-mounted device(s) 101 and the first beacon and the range between the head-mounted device(s) 101 and the second beacon, determination component 110 may apply the Pythagorean theorem to determine the distances between the first beacon and the second beacon.

In some implementations, the distances between the one or more reference points may be determined by the visual content defined by the visual information conveyed by output signals generated by the stereo pair of image sensors. Determination component 110 may use the first visual information conveyed by output signals captured within the first field of view of the first image sensor and the second visual information conveyed by output signals captured within the second field of view of the second image sensor to determine the distances between the one or more reference points. Determination component 110 may use the first visual information and the second visual information to triangulate the distances between the one or more reference points.

In some implementations, the distances between the one or more reference points may be determined by the range information conveyed by output signals of the stereo pair of proximity sensors. Determination component 110 may use the first range information and the second range information to triangulate the distances between the one or more reference points.

In some implementations, determination component 110 may be configured to determine directions of the one or more reference points relative to head-mounted device(s) 101, and/or other information. In some implementations, determination component 110 may be configured to determine directions of the one or more reference points relative to head-mounted device(s) 101 from the visual information, and/or other information. The directions of the one or more reference points relative to head-mounted device(s) 101 may convey information about the angle of the one or more reference points relative to head-mounted device(s) 101. In some implementations, determination component 110 may determine a first direction of the first beacon relative to head-mounted device(s) 101, a second direction of the second beacon relative to head-mounted device(s) 101, and/or other directions.

In some implementations, determination component 110 may be configured to determine directions of the one or more reference points relative to head-mounted device(s) 101 from the visual content defined by the visual information. Determination component 110 may be configured to determine directions of the one or more reference points relative to head-mounted device(s) 101 from the visual content by measuring the position of the one or more reference points within the field of view of the one or more image sensors of the head-mounted device(s) 101. In some implementations, determination component 110 may be configured to compare the position of the one or more reference points within the field of view of the one or more image sensors of the head-mounted device(s) 101 to a position near the center of the field of view of the one or more image sensors of the head-mounted device(s) 101 to determine the directions of the one or more reference points relative to head-mounted device(s) 101.

For example, if an image sensor had a field of view of 110 degrees, and a reference point is positioned directly at the center of the field of view of the image sensor, determination component 110 may determine that the reference point may be at 0 degrees. If the reference point is positioned at an edge of the field of view of the image sensor, determination component 110 may determine that the reference point may be at positive 55 degrees or negative 55 degrees. In some implementations, determination component 110 may use other mathematical techniques to determine the direction of the one or more reference points relative to the head-mounted device(s) 101.

In some implementations, determination component 110 may be configured to determine directions of the one or more reference points relative to head-mounted device(s) 101 from the range information. In some implementations, based on the distance between the one or more reference points, the ranges between the one or more reference points, and/or other information, determination component 110 may determine the directions of the one or more reference points relative to head-mounted device(s) 101 by applying the Pythagorean theorem and/or other techniques. For example, the first beacon, the second beacon, and head-mounted device(s) 101 may be in three distinct positions in the real-world environment. The three positions in the real-world environment may form three points of a triangle. Based on the distance between the first beacon and the second beacon, the range between the first beacon and the head-mounted device(s) 101, the range between the second beacon and the head-mounted device(s) 101, and/or other information, determination component 110 may apply the Pythagorean theorem to determine the direction of the one or more reference points relative to head-mounted device(s) 101.

In some implementations, determination component 110 may be configured to determine the directions of the one or more reference points relative to head-mounted device(s) 101 from the visual content defined by the visual information conveyed by output signals generated by the stereo pair of image sensors. Determination component 110 may use the first visual content defined by the first visual information captured within the first field of view of the first image sensor and the second visual content defined by the second visual information captured within the second field of view of the second image sensor to determine the directions of the one or more reference points relative to head-mounted device(s) 101.

In some implementations, determination component 110 may use the first visual content and the second visual content to determine the directions of the one or more reference points relative to head-mounted device(s) 101 by measuring the position of the one or more reference points within the fields of view of the first image sensor and the second image sensor. Based on the position of the one or more reference points within the fields of view of the first image sensor and the second image sensor, determination component 110 may determine the direction of the one or more reference points relative to head-mounted device(s) 101. For example, determination component 110 may compare differences in the positions of the first beacon within the field of view of the first image sensor and within the within the field of view of the second image sensor to determine the directions of the one or more reference points relative to head-mounted device(s) 101. In some implementations, determination component 110 may use the first visual content and the second visual content to determine the directions of the one or more reference points relative to head-mounted device(s) 101 using the one or more mathematical techniques, and/or other techniques.

In some implementations, determination component 110 may be configured to determine distances between the head-mounted device(s) 101 and the individual reference points from the visual information. For example, determination component 110 may be configured to determine a distance between the head-mounted device(s) 101 and the first beacon, a distance between the head-mounted device(s) 101 and the second beacon, and/or other distances between the head-mounted device(s) 101 and other electromagnetic radiation beacons. In some implementations, determination component 110 may be configured to determine the distances between the one or more reference points and head-mounted device(s) 101 through the geometric relationship between client computing device(s) 104 and the one or more reference points. For example, based on the distance between the one or more reference points and the direction of the one or more reference points with respect to the head-mounted device(s) 101, determination component 110 may apply the Pythagorean theorem to determine the distances between the one or more reference points and the head-mounted device(s) 101.

In some implementations, determination component 110 may be configured to determine the distances between the one or more reference points head-mounted device(s) 101 from the visual content defined by the visual information conveyed by output signals generated by the stereo pair of image sensors. Determination component 110 may use the first visual content defined by the first visual information captured within the first field of view of the first image sensor and the second visual content defined by the second visual information captured within the second field of view of the second image sensor to determine the distances between the one or more reference points and the head-mounted device(s) 101.

In some implementations, based on the direction and the difference in position of the one or more reference points within the fields of view of the first image sensor and the second image sensor, determination component 110 may apply the Pythagorean theorem and/or other techniques to determine the distances between the head-mounted device(s) 101 and the one or more reference points. For example, based on the direction and the difference in position of the first beacon within the fields of view of the first image sensor and the second image sensor, determination component 110 may apply the Pythagorean theorem and/or other techniques to determine the distances between the head-mounted device(s) 101 and the one or more reference points.

In some implementations, determination component 110 may be configured to determine the position of head-mounted device(s) 101 relative to the one or more reference points based the geometric relationship between the one or more reference points and the head-mounted device(s) 101.

In some implementations, based on the distance between the one or more reference points and head-mounted device(s) 101, determination component 110 may determine the position of head-mounted device(s) 101 relative to the one or more reference points. For example, based on the distance between the first beacon and head-mounted device(s) 101 and the distance between the second beacon and head-mounted device(s) 101, the position of the head-mounted device(s) 101 relative to the first beacon and/or the second beacon may be calculated.

In some implementations, based on the direction of the first beacon relative to head-mounted device(s) 101 and the direction of the second beacon relative to head-mounted device(s) 101, the position of the head-mounted device(s) 101 relative to the first beacon and the second beacon may be triangulated. For example, the direction of the first beacon relative to head-mounted device(s) 101 may point in a first direction and the direction of the second beacon relative to head-mounted device(s) 101 may point in a second direction. The position where the first direction and the second direction cross may be the position of the head-mounted device(s) 101.

In some implementations, based on the direction of the first beacon relative to head-mounted device(s) 101 and the distance between the first beacon and head-mounted device(s) 101, the position of head-mounted device(s) 101 relative to the first beacon may be determined. In some implementations, based on the direction of the second beacon relative to head-mounted device(s) 101 and the distance between the second beacon and head-mounted device(s) 101, the position of head-mounted device(s) 101 relative to the second beacon may be determined. In some implementations, based on the position of head-mounted device(s) 101 relative to the first beacon, the position of head-mounted device(s) 101 relative to the second beacon, and the distance between the first beacon and second beacon, the determination component 110 may determine the position of head-mounted device(s) 101 relative to the first beacon and the second beacons.

In some implementations, determination component 110 may be configured to determine positions of other head-mounted devices in the real-world environment. The positions of the other head-mounted devices in the real-world environment may be determined based on the one or more reference points in the real-world environment. The position of the other head-mounted devices in the real-world environment may include the headings of the other head-mounted devices with respect to the one or more reference points. In some implementations, determination component 110 may be configured to obtain visual information, range information, and/or other information from the other head-mounted devices. In some implementations, determination component 110 may be configured to determine positions of other head-mounted devices with respect to one or more reference points. The positions of other head-mounted devices with respect to one or more reference points may be determined in the same way the positions of head-mounted device(s) 101 is determined with respect to one or more reference points.

By way of a non-limiting example, the first client computing device of the first head-mounted device may obtain the visual content, the range information, and/or other information from the second client computing device of the second head-mounted device. The first client computing device may determine the position of the second client computing device relative to the one or more reference points. The first client computing device may be configured to determine the position of the second client computing device relative to the one or more reference points from the visual content, the range information, and/or other information obtained by the second client computing device. The first client computing device may determine the position of the second client computing device relative to the one or more reference points using components similar to determination component 110.

In some implementations, determination component 110 may be configured to transmit the position of the head-mounted device(s) 101 relative to the one or more reference points to other devices. Determination component 110 may be configured to transmit its position relative to the one or more reference points to the other client computing devices. For example, the first client computing device may transmit its position relative to the one or more reference points to the second client computing device.

In some implementations, determination component 110 may be configured to obtain position information and/or other information. The position information may define the positions of the other head-mounted devices relative to the one or more reference points. The position information may define the positions of the other head-mounted devices relative to the first beacon, the second beacon, and/or other beacons. The other head-mounted devices may determine its positions relative to the one or more reference points. The other head-mounted devices may determine its positions relative to the one or more reference points using components similar to determination component 110. The other head-mounted devices may transmit the position information defining the positions of the other head-mounted devices relative to the one or more reference points. The other head-mounted devices may transmit the position information to client computing device(s) 104.

For example, the first client computing device may obtain second position information defining a position of the second client computing device relative to the one or more reference points. The position of the second client computing device relative to the one or more reference points may be determined by the second client computing device.

In some implementations, determination component 110 may be configured to determine a pseudo-position of head-mounted device(s) 101. In some implementations, the pseudo-position of head-mounted device(s) 101 may be the position of head-mounted device(s) 101 when head-mounted device(s) 101 is at the position of the other head-mounted devices relative to the one or more reference points. In some implementations, the pseudo-position may be different from the actual position of head-mounted device(s) 101 relative to the one or more reference points. The pseudo-position of head-mounted device(s) 101 may be a calculated position of head-mounted device(s) 101. The pseudo-position of head-mounted device(s) 101 may be the calculated position of head-mounted device(s) 101 relative to the one or more reference points when head-mounted device(s) 101 is at the position of the other head-mounted devices relative to the one or more reference points. The pseudo-position may convey a heading of head-mounted device(s) 101 at the heading of the other head-mounted devices relative to the one or more reference points.

In some implementations, determination component 110 may be configured to determine a path between the pseudo-position and the actual position of head-mounted device(s) 101. The path between the pseudo-position and the actual position of head-mounted device(s) 101 define a way for head-mounted device(s) 101 in the actual position to move to the pseudo-position. In some implementations, determination component 110 may be configured to compare the pseudo-position and the actual position of head-mounted device(s) 101 to determine the path. The path between the pseudo-position and the actual position of head-mounted device(s) 101 may convey a change in heading between the pseudo-position and the actual position of head-mounted device(s) 101.

For example, the first client computing device may determine a first pseudo-position. The first pseudo-position may be a position relative to a set of two common reference points. The first pseudo-position may be the position of the first client computing device when the first client computing device is at the position of the second client computing device. The position of the second client computing device may be relative to the same set of two common reference points. The first client computing device may determine a path between the first pseudo-position and the actual position of the first client computing device. The path between the first pseudo-position and the actual position of the first client computing device may be the way for the first client computing device to move to the second client computing device.

In some implementations, determination component 110 may be configured to determine a calculated heading. The calculated heading may be the heading of the heading sensor of client computing device(s) 104 if head-mounted device(s) 101 was at a different position, e.g., the pseudo-position. The heading of the heading sensor of client computing device(s) 104 may be conveyed by the heading information. The calculated heading may be the heading of the heading sensor of client computing device(s) 104 altered to convey a heading at the different position, e.g., the pseudo-position. The calculated heading may be the heading of the heading sensor of client computing device(s) 104 when head-mounted device(s) 101 may be at the position of the other head-mounted devices. The calculated heading may be a heading with respect to the reference frame of the heading sensor of the client computing device(s) 104.

In some implementations, determination component 110 may be configured to determine the calculated heading when head-mounted device(s) 101 may be at the position of the other head-mounted devices, and/or other positions. In some implementations, the calculated heading may be determined by comparing the heading conveyed by the pseudo-position and the actual heading conveyed by the heading sensor of client computing device(s) 104. In some implementations, determination component 110 may modify the heading conveyed by the heading sensor of client computing device(s) 104 by the path between the pseudo-position and the actual position of head-mounted device(s) 101 to determine the calculated heading. The path between the pseudo-position and the actual position of head-mounted device(s) 101 may convey a change in heading between the pseudo-position and the actual position of head-mounted device(s) 101. The calculated heading may be the heading conveyed by the heading sensor of client computing device(s) 104 modified by the change in heading between the pseudo-position and the actual position of head-mounted device(s) 101. By way of non-limiting example, if the change in heading between the pseudo-position and the actual position of head-mounted device(s) 101 was 25 degrees, the heading of the heading sensor of the client computing device(s) 104 may be altered by 25 degrees to obtain the calculated heading.

For example, the first client computing device may determine a first calculated heading. The first calculated heading may be the heading of the first client computing device when the first client computing device may be at the position (e.g., the first pseudo-position) of the second client computing device relative to the one or more reference points. In some implementations, the first client computing device may modify the heading conveyed by the heading sensor of the first client computing device by the path between the first pseudo-position and the actual position of the first client computing device to determine the first calculated heading. The path between the first pseudo-position and the actual position of the first client computing device may convey a change in heading between the first pseudo-position and the actual position of the first client computing device. The first calculated heading may be the heading conveyed by the heading sensor of first client computing device modified by the change in heading between the first pseudo-position and the actual position of first client computing device. By way of non-limiting example, if the difference between the first calculated heading and the actual heading of the first client computing device relative to the one or more reference points was 25 degrees, the heading conveyed by the heading information of the first heading sensor may be altered by 25 degrees to determine the first calculated heading.

In some implementations, the calculated heading of client computing device(s) 104 with respect to the reference frame of the heading sensor of the client computing device(s) 104 may be different compared to the heading of the other client computing devices with respect to the reference frame of the heading sensor of the other client computing devices. The difference between the calculated heading of the client computing device(s) 104 and the heading of the other client computing devices may be because the heading sensor of the client computing device(s) 104 and the heading sensor of the other client computing devices may be calibrated along different reference frames. As a result, the calculated heading of client computing device(s) 104 and the heading of the heading sensor of the other client computing devices may be different.

For example, the first calculated heading of the first client computing device may be different compared to the heading of the second client computing device conveyed by the second heading sensor. This may be because the first heading sensor and the second heading sensor may be calibrated along different reference frames. The first heading sensor may be calibrated along the first reference frame, and the second heading sensor may be calibrated along the second reference frame. The first reference frame and the second reference frame may be different reference frames. As a result, the first heading sensor and the heading sensor may convey different headings when they are in the same position relative to the one or more reference points.

In some implementations, determination component 110 may determine a heading difference. The heading difference (or discrepancy) may define the difference between the calculated heading and the heading of the heading sensor of the other client computing devices. In some implementations, the heading difference (or discrepancy) may define discrepancies between the reference frames of the individual heading sensors of the individual client computing devices. Determination component 110 may compare the calculated heading to the heading of the heading sensor of the other client computing devices to determine the heading difference. By way of non-limiting example, if the calculated heading conveyed a heading of 50 degrees relative to the one or more reference points and the heading of the heading sensor of the other client computing devices conveyed a heading of 60 degrees, the difference between the calculated heading and the heading of the heading sensor of the other client computing devices is 10 degrees. In this example, the heading difference may be 10 degrees.

In some implementations, presentation component 112 may be configured to effectuate presentation of the shared-augmented reality experience. In some implementations, presentation component 112 may effectuate presentation of shared augmented reality content of the shared-augmented reality experience. In some implementations, presentation component 112 may effectuate presentation of shared augmented reality content through client computing device(s) 104, and/or other devices.

In some implementations, presentation component 112 may effectuate presentation of the shared-augmented reality experience. Presentation component 112 may effectuate presentation of the shared-augmented reality experience including the shared-augmented reality content. Presentation component 112 may effectuate presentation of the shared-augmented reality content to head-mounted device(s) 101. In some implementations, the shared-augmented reality content may be effectuated through client computing device(s) 104. In some implementations, the shared-augmented reality content may be effectuated through client computing device(s) 104 may be based on the heading defined by the heading information conveyed by the heading sensor of the client computing device(s) 104. In some implementations, the arrangement of the shared-augmented reality content effectuated through the client computing device(s) 104 may be based on the heading of the heading sensor of the client computing device(s) 104. For example, the shared-augmented reality content may be presented under specific headings of the heading sensor of the client computing device(s) 104. The specific heading may be determined based on the shared-augmented reality experience. In some implementations, the arrangement of the shared-augmented reality content effectuated through the client computing device(s) 104 may be based on the reference frame of the heading sensor of the client computing device(s) 104.

In some implementations, the presentation component 112 may effectuate presentation of the shared-augmented reality content to client computing device(s) 104 with respect to the one or more reference points. In some implementations, the shared-augmented reality content presented may be arranged with respect to the one or more reference points. For example, an augmented reality content forming a tower structure may be configured to be positioned in proximity to the first beacon. The presentation component 112 may effectuate presentation augmented reality content such that the augmented reality content forming the tower structure to appear in proximity to the first beacon from the perspective of the first user and the second user.

In some implementations, the shared-augmented reality content may be presented with respect to the one or more reference points and at specific headings. For example, the shared-augmented reality content may be presented respect to the one or more reference points at the specific locations and the specific heading.

In some implementations, the presentation component 112 may be configured to transmit the heading difference to the other client computing devices. The shared augmented reality content may be presented to the other head-mounted devices. In some implementations, the shared-augmented reality content may be effectuated through the other client computing devices of the other head-mounted devices. In some implementations, the shared-augmented reality content may be effectuated through the other client computing devices of the other head-mounted devices based on the heading defined by the heading information conveyed by output signals of the heading sensors of the other client computing devices modified by the heading difference. In some implementations, the shared-augmented reality content may be effectuated through the other client computing devices of the other head-mounted devices based on the reference frame of the heading of the heading sensors of the other client computing devices modified by the heading difference. The heading difference may compensate for the discrepancies between the heading sensors of the client computing device(s) 104 and the heading sensors of the other client computing devices. The heading difference may compensate for the discrepancies between the reference frame of the heading sensors of the client computing device(s) 104 and the reference frame of the heading sensors of the other client computing devices. The heading of the heading sensors of the other client computing devices may be modified by the heading difference such that discrepancies between heading sensors of the client computing device(s) 104 and the heading sensors of the other client computing devices may be compensated for. The heading of the heading sensors of the other client computing devices may be modified by the heading difference such that the heading of the heading sensors of the other client computing devices may be adjusted to be with respect to the reference frame of the heading sensor of the client computing device(s) 104.

For example, the first head-mounted device may facilitate the presentation of the shared-augmented reality content through the first client computing device. The shared augmented reality content presented through the first client computing device may be arranged based on the first heading of the first heading sensor. The first client computing device may transmit the first heading difference to the second client computing device. The shared augmented reality content presented through the second client computing device may be arranged based on the second heading of the second heading sensor modified by the first heading difference. The second heading of the heading sensor may be modified by the first heading difference such that the first heading and the second heading modified by the first heading difference may be in the same reference frame. For example, the second heading of the heading sensor may be modified by the first heading difference such that the first heading and the second heading modified by the first heading difference may define the same heading when the first client computing device and the second client computing device are at the same position. In some implementations, the second reference frame of the heading sensor may be modified by the first heading difference such that the first reference frame and the second reference frame modified by the first heading difference may adjust the second reference frame to be similar to the first reference frame.

In a non-limiting example, the shared-augmented reality content may be arranged with respect to at least one of the one or more reference points within the field of view of the first client computing device. The shared augmented reality content presented to the second client computing device may be arranged with respect to at least one of the one or more reference points within the field of view of the second client computing device. The one or more reference points within the field of view of the second client computing device may be the same one or more reference points within the field of view of the first client computing device. In other words, the shared-augmented reality content is presented with respect to the reference frame of the first client computing device. For example, if the shared-augmented reality content appears to be facing the first user of the first client computing device from the perspective of the first client computing device, the shared-augmented reality content may also appear to be facing the first user of the first client computing device from the perspective of the second client computing device.

In some implementations, head-mounted device(s) 101, client device(s) 104, and/or external resources 120 may be operatively linked via one or more electronic communication links. For example, such electronic communication links may be established, at least in part, via the network 103 such as the Internet and/or other networks. It will be appreciated that this is not intended to be limiting and that the scope of this disclosure includes implementations in which head-mounted device(s) 101, client device(s) 104, and/or external resources 120 may be operatively linked via some other communication media.

In some implementations, external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

In some implementations, head-mounted device(s) 101 may include electronic storage 122, one or more processors 124, and/or other components. Head-mounted device(s) 101 may include communication lines, or ports to enable the exchange of information with a network and/or other computing devices. Illustration of head-mounted device(s) 101 in FIG. 1 is not intended to be limiting. Servers(s) 102 may include a plurality of hardware, software, and/or firmware components operating together to provide the functionality attributed herein to head-mounted device(s) 101. For example, head-mounted device(s) 101 may be implemented by a cloud of computing devices operating together as head-mounted device(s) 101.

In some implementations, electronic storage 122 may include electronic storage media that electronically stores information. The electronic storage media of electronic storage 122 may include one or both of system storage that is provided integrally (i.e., substantially nonremovable) with head-mounted device(s) 101 and/or removable storage that is removably connectable to head-mounted device(s) 101 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from head-mounted device(s) 101, information received from client computing device(s) 104, and/or other information that enables head-mounted device(s) 101 to function as described herein.

In some implementations, processor(s) 124 may be configured to provide information processing capabilities in head-mounted device(s) 101. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same client computing device, or processor(s) 124 may represent processing functionality of a plurality of devices operating in coordination. The processor(s) 124 may be configured to execute computer-readable instruction components 106, 108, 110, and/or other components. The processor(s) 124 may be configured to execute components 106, 108, 110, 112, and/or other components by software; hardware; firmware; some combination of software, hardware, and/or firmware; and/or other mechanisms for configuring processing capabilities on processor(s) 124.

It should be appreciated that although components 106, 108, 110, and 112 are illustrated in FIG. 1 as being co-located within a single processing unit, in implementations in which processor(s) 124 includes multiple processing units, one or more of components 106, 108, 110, and/or 112 may be located remotely from the other components. The description of the functionality provided by the different components 106, 108, 110, and/or 112 described herein is for illustrative purposes and is not intended to be limiting, as any of components 106, 108, 110, and/or 112 may provide more or less functionality than is described. For example, one or more of components 106, 108, 110, and/or 112 may be eliminated, and some or all of its functionality may be provided by other ones of components 106, 108, 110, and/or 112. As another example, processor(s) 124 may be configured to execute one or more additional components that may perform some or all of the functionality attributed herein to one of components 106, 108, 110, and/or 112.

Figure 2:
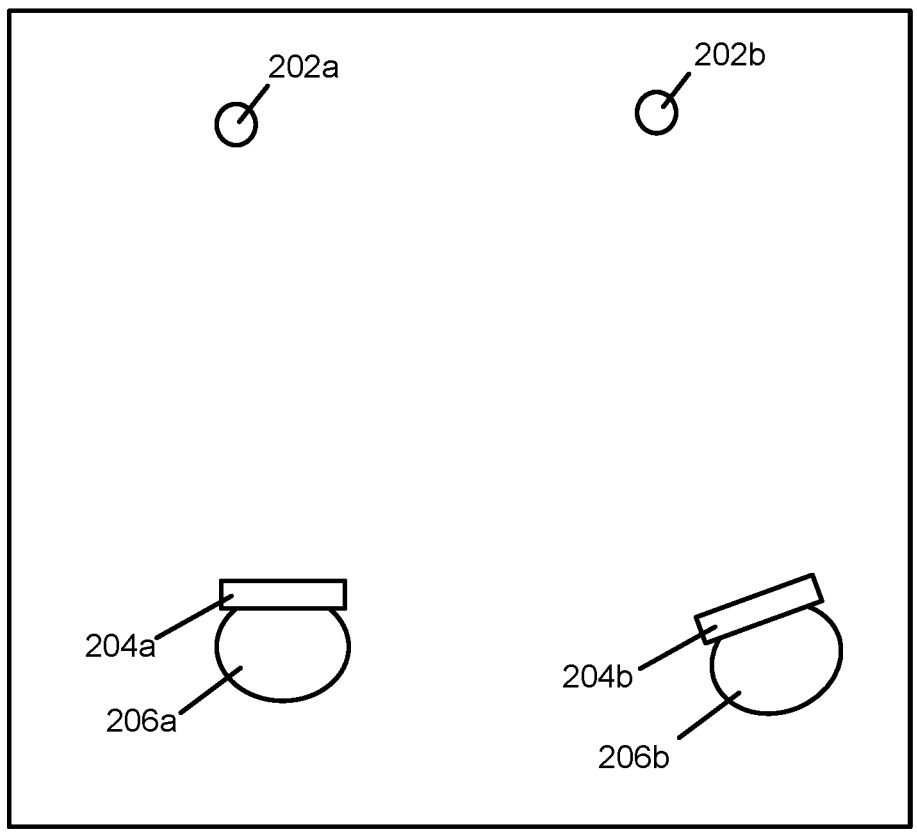
FIG. 2 illustrates a first user with a first head-mounted device and a second user with a second head-mounted device in a real-world environment with two common reference points.

FIG. 2 illustrates an example of users a real-world environment interacting with a system for providing users with shared augmented reality experience, such as system 100 shown in FIG. 1 and described herein. The shared augmented reality experience may include shared augmented reality content, and/or other content. The users includes a first user 206a, a second user 206b, and/or other users. There may be one or more reference points in proximity to the users. The one or more reference points may include a first reference point 202a, a second reference point 202b, and/or other reference points.

In some implementations, first user 206a may be associated with a first head-mounted device 204a. First head-mounted device 204a may be installed (e.g. mounted) on the head of first user 206a. First head-mounted device 204a include a first client computing device, and/or other components. The first client computing device may be removably coupled to first head-mounted device 204a.

In some implementations, second user 206b may be associated with a second head-mounted device 204b. The second head-mounted device 204b may installed (e.g., mounted) on the head of second user 206b. Second head-mounted device 204b includes a second computing device, and/or other components. The second client computing device may be removably coupled to second head-mounted device 204b.

In some implementations, first head-mounted device 204a may include a first sensor set. The first sensor set may include a first heading sensor, a first stereo pair of image sensors, and/or other sensors. The first stereo pair of image sensors may capture visual information including the image of the one or more reference points. The first heading sensor may generate output signal conveying heading information relative to a reference frame of the first heading sensor.

In some implementations, first head-mounted device 204a may determine its position relative to the one or more reference points based on the visual information captured by the first stereo pair of image sensors.

In some implementations, second head-mounted device 204b may include a second sensor set. The second sensor set may include a second stereo pair of heading sensors, a second image sensor, and/or other sensors. The second stereo pair of image sensors may capture visual information including the image of the one or more reference points. The second heading sensor may generate output signal conveying heading information relative to a reference frame of the second heading sensor.

In some implementations, second head-mounted device 204b may determine its position relative to the one or more reference points based on the visual information captured by the second stereo pair of image sensors.

Figure 3:
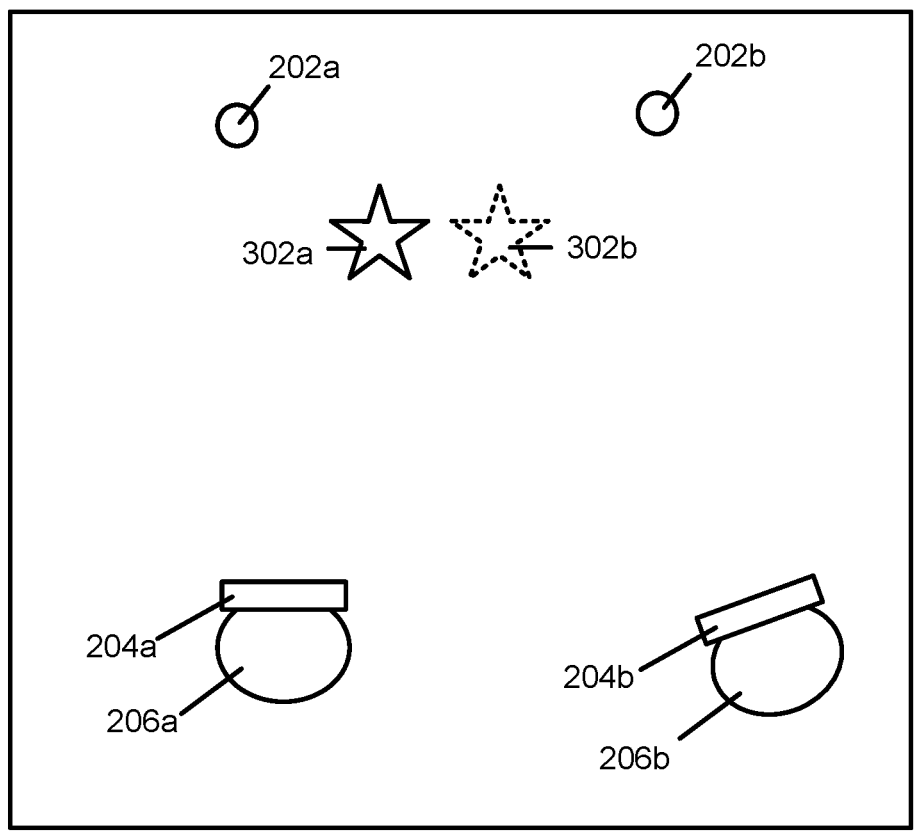
FIG. 3 illustrates the first user with the first head-mounted device and the second user with the second head-mounted device seeing two versions of the same augmented reality content due to a discrepancy between the sensors of the first head-mounted device and sensors of the second head-mounted device.

Referring to FIG. 3, when the shared-augmented reality content is presented to first head-mounted device 204a based on the first heading and second head-mounted device 204b based on the second heading, the arrangement of the shared-augmented reality content may be different for first head-mounted device 204a and second head-mounted device 204b. First head-mounted device 204a may see the shared-augmented reality content arranged at position 302a, and second head-mounted device 204b may see the shared-augmented reality content arranged at position 302b. The difference in the arrangement may be caused by a discrepancy between the first heading and the second heading. This may degrade the shared experience.

In some implementations, first head-mounted device 204a and second head-mounted device 204b may use a system similar to system 100 to adjust the discrepancy between the first heading sensor reference frame and the second heading sensor reference frame.

For example, first head-mounted device 204a may determine a calculated heading of the first heading sensor. The calculated heading may be the heading conveyed by the output signals of the first heading sensors when first head-mounted device 204a is at the position of second head-mounted device 204b. The calculated heading is compared to the heading conveyed by the output signals of the second heading sensors at the position of second head-mounted device 204b to determine a heading difference. The heading difference conveying the discrepancy between the first heading sensor reference frame and the second heading sensor reference frame.

Figure 4:
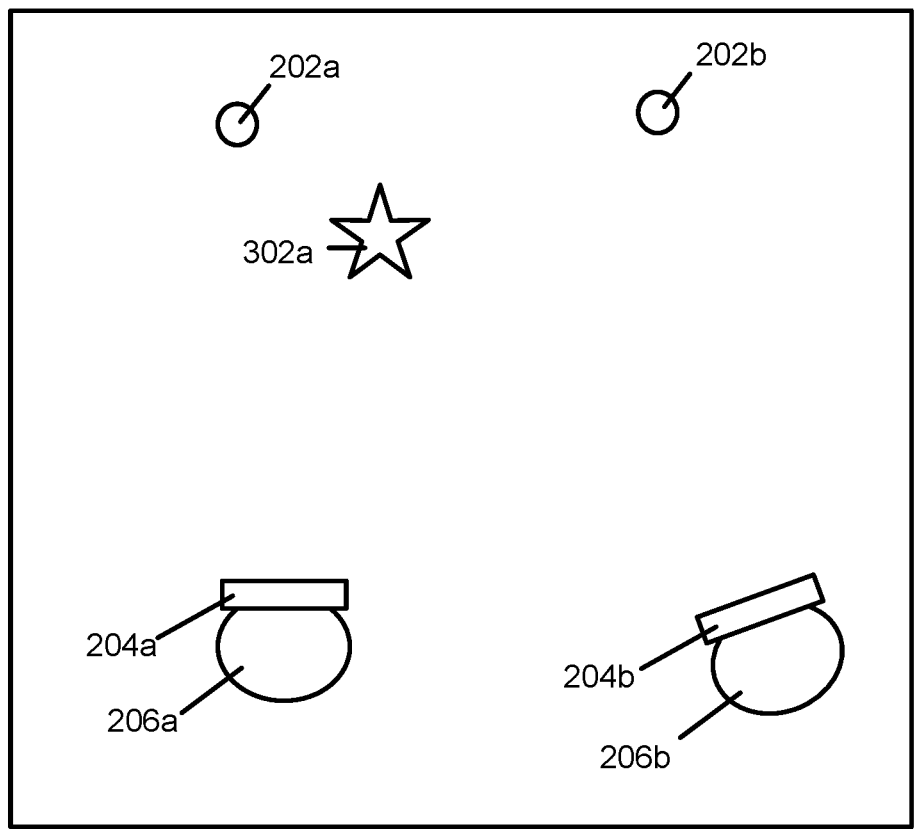

Referring to FIG. 4, system 100 may adjust the discrepancy between the first heading sensor reference frame and the second heading sensor reference frame such that the first head-mounted device 204a and second head-mounted device 204b may be presented with the shared-augmented reality content in the same arrangement. The shared augmented reality content may be arranged such that the shared-augmented reality content may be arranged based on the reference frame of first head-mounted device 204a, e.g., The first heading sensor reference frame. The first user of the first head-mounted device 204a and the second user of second head-mounted device 204b may both perceive the shared-augmented reality content arranged at position 302a.

For example, the shared-augmented reality content may be arranged based on the heading conveyed by the heading sensors of the individual heading sensors or the references frame of the individual heading sensor. The heading conveyed by the output signals of the second heading sensors may be modified by the heading difference such that the shared-augmented reality content presented to second head-mounted device 204b is arranged at the same position as first head-mounted device 204a. In some implementations, the reference frame of the second heading sensor may be modified by the heading difference such that the shared-augmented reality content presented to second head-mounted device 204b is arranged at the same position as first head-mounted device 204a.

Figure 5:
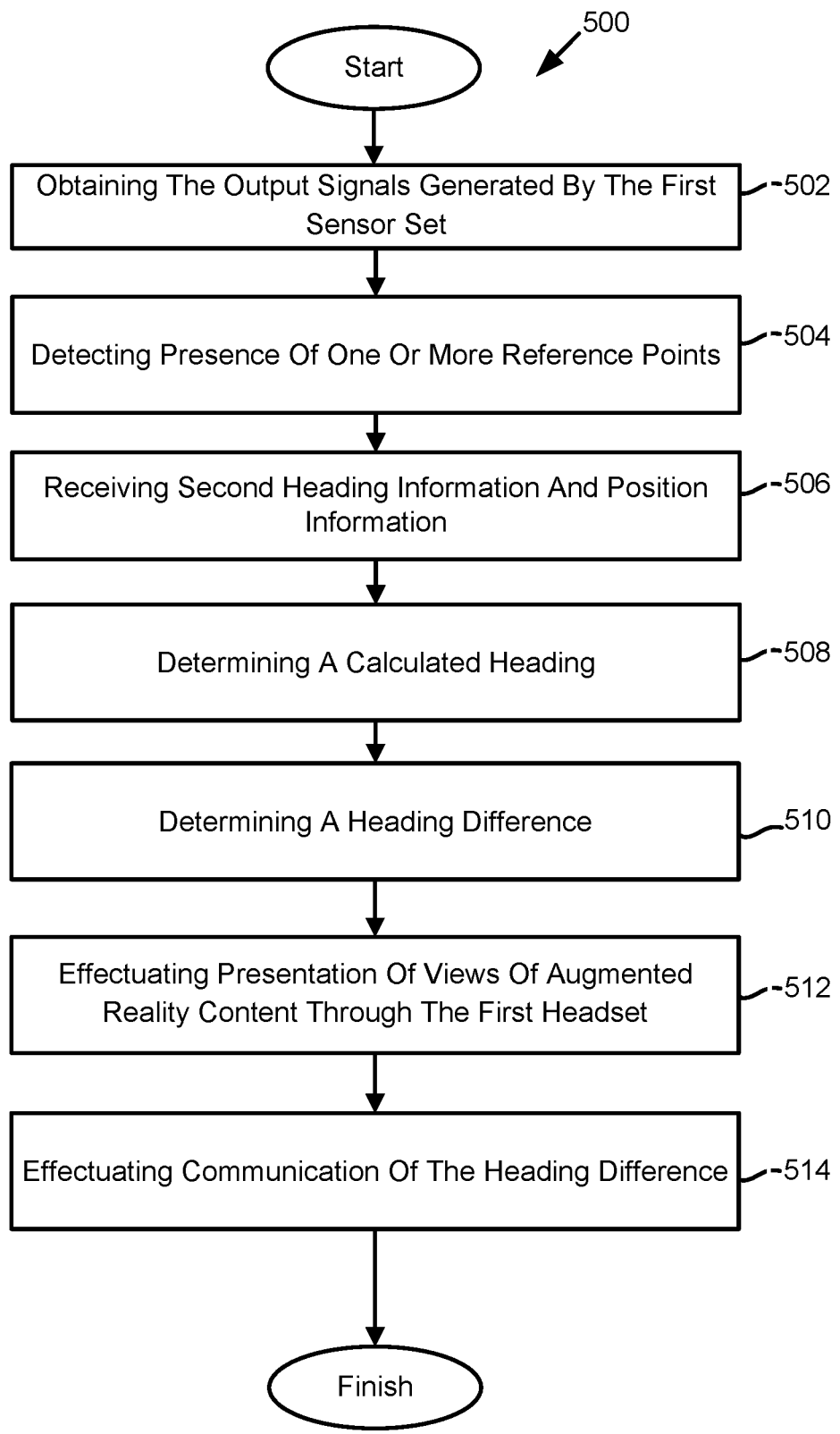
FIG. 5 illustrates a method for providing users with shared augmented reality experiences, in accordance with one or more implementations.

FIG. 5 illustrates a method 500 to provide users with a shared augmented reality experience. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

In some implementations, the method 500 includes operations for providing users with shared augmented reality experiences. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be configured to provide users with a shared augmented reality experience. In some implementations, the shared-augmented reality experience may include providing one or more head-mounted devices with shared augmented reality content. The shared augmented reality content may be accessed by the individual head-mounted devices contemporaneously.

At an operation 502, the output signals generated by the first sensor set may be obtained. In some implementations, operation 502 may be performed by an image processing component the same as or similar to image processing component 106 (shown in FIG. 1 and described herein).

At an operation 504, the presence of one or more reference points (for example, a set of two common reference points) in the first visual content defined by the first view information may be detected based on the output signals generated by the first sensor set. In some implementations, operation 504 may be performed by one or more physical processors executing an image processing component the same as or similar to image processing component 106 (shown in FIG. 1 and described herein).

At an operation 506, information may be received from a second head-mounted device. The received information may include one or more of second heading information indicating a heading of the second head-mounted device determined by the second head-mounted device based on output signals generated by a second heading sensor coupled to the second head-mounted device, position information conveying position and heading of the second head-mounted device relative to at least two reference points physically present in the real world, and/or other information. In some implementations, operation 506 may be performed by one or more physical processors executing a determination component the same as or similar to determination component 110 (shown in FIG. 1 and described herein).

At an operation 508, a calculated heading of the heading of the first head-mounted device in the real world with respect to the first reference frame may be determined based on the position information. The calculated heading is the heading of the first heading sensor at the position and heading of the second head-mounted device relative to at least the two reference points. In some implementations, operation 508 may be performed by one or more physical processors executing a determination component the same as or similar to determination component 110 (shown in FIG. 1 and described herein).

At an operation 510, a heading difference between the calculated heading and heading of the second heading sensor may be determined. In some implementations, operation 510 may be performed by one or more physical processors executing a determination component the same as or similar to determination component 110 (shown in FIG. 1 and described herein).

At an operation 512, presentation of views of augmented reality content through the first head-mounted device may be effectuated. The augmented reality content is presented with respect to the heading of the first heading sensor. In some implementations, operation 512 may be performed by one or more physical processors executing a presentation component the same as or similar to presentation component 112 (shown in FIG. 1 and described herein).

At an operation 514, communication of the heading difference to the second head-mounted device may be effectuated, such that views of the augmented reality content presented through the second head-mounted device are presented with respect to the heading of the second heading sensor modified by the heading difference. In some implementations, operation 514 may be performed by one or more physical processors executing a determination component the same as or similar to determination component 110 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. An augmented reality system comprising:
   a first head-mounted device configured to be worn on a head of a user;
   a first sensor set of one or more sensors coupled to the first head-mounted device, the first sensor set being configured to generate output signals conveying first view information and first range information, the first view information defining first visual content within a first field of view, the first range information including ranges from the first head-mounted device to objects present within the first field of view;
   the first sensor set comprising a first heading sensor, the first heading sensor being configured to generate output signals conveying first heading information, the first heading information indicating a heading of the first head-mounted device in the real world with respect to a first reference frame;
   one or more physical processors configured by machine-readable instructions to:
      obtain the output signals generated by the first sensor set;
      detect, based on the output signals generated by the first sensor set, presence of one or more reference points in the first visual content defined by the first view information;
      receive, from a second head-mounted device, (i) second heading information indicating a heading of the second head-mounted device determined based on output signals generated by a second heading sensor coupled to the second head-mounted device, and (ii) position information conveying position and heading of the second head-mounted device relative to at least two reference points physically present in the real world;
      determine, based on the position information conveying position and heading of the second head-mounted device relative to the at least two reference points, a calculated heading of the first heading sensor, wherein the calculated heading is a heading conveyed by the output signals of the first heading sensor while the first heading sensor is at the position and heading conveyed by the position information;
      determine a heading difference between the calculated heading and the heading of the second head-mounted device determined based on the output signals generated by the second heading sensor;
      effectuate presentation of views of augmented reality content through the first head-mounted device, wherein the augmented reality content is presented with respect to the heading of the first heading sensor; and
      responsive to the presentation of views of augmented reality content through the first head-mounted device effectuate communication of the heading difference to the second head-mounted device, such that views of the augmented reality content presented through the second head-mounted device are presented with respect to the heading of the second heading sensor modified by the heading difference.

2. The system of claim 1, wherein determining the calculated heading comprises:
   determining, based on the presence of the at least two reference points in the first visual content defined by the first view information, the position of the first head-mounted device with respect to the at least two reference points;
   determining, based on the position information, a difference between the position of the first head-mounted device and the second head-mounted device with respect to the at least two reference points; and
   determining the calculated heading by modifying the heading of the first heading sensor by the difference between the position of the first head-mounted device and the second head-mounted device.

3. The system of claim 1, wherein the individual ones of the one or more reference points includes individual electromagnetic radiation beacons, including light beacons.

4. The system of claim 3, wherein the individual electromagnetic radiation beacons are identified by their individual wavelengths.

5. The system of claim 1, wherein an arrangement of the augmented reality content presented through the first head-mounted device is arranged with respect a first reference point or a second reference point; and the arrangement of the augmented reality content presented through the second head-mounted device is arranged with respect to the same reference point as the first head-mounted device.

6. The system of claim 1, wherein the second head-mounted device is configured to be worn on a head of a second user.

7. The system of claim 1, wherein the first head-mounted device includes a first client computing device coupled to the first head-mounted device, the first client computing device includes the first heading sensor, and the second head-mounted device includes a second client computing device coupled to the second head-mounted device, the second client computing device includes the second heading sensor.

8. The system of claim 1, wherein the augmented reality content is presented through the first head-mounted device and the second head-mounted device contemporaneously.

9. The system of claim 1, wherein the position information conveying position and heading of the second head-mounted device relative to at least two reference points physically present in the real world is determined by a second sensor set of one or more sensors coupled to the second head-mounted device, the second sensor set being configured to generate output signals conveying second view information and second range information, the second view information defining second visual content within a second field of view, the second range information including ranges from the second head-mounted device to objects present within the second field of view.

10. The system of claim 9, wherein the one or more physical processors are further configured by machine-readable instructions to:
   obtain the output signals generated by the second sensor set;
   detect, based on the output signals generated by the second sensor set, presence of the at least two reference points in the second visual content defined by the second view information; and
   determine, based on the presence of the at least two reference points in the second visual content defined by the second view information, the position information conveying position and heading of the second head-mounted device relative to the at least two reference points.

11. A method for providing augmented reality experience, the method comprising:
   obtaining output signals generated by a first sensor set coupled with a first head-mounted device, the first head-mounted device configured to be worn on a head of a user, the output signals conveying first view information and first range information, the first view information defining first visual content within a first field of view, the first range information including ranges from the first head-mounted device to objects present within the first field of view, the first sensor set further comprising a first heading sensor, the first heading sensor being configured to generate the output signals conveying first heading information, the first heading information indicating a heading of the first head-mounted device in a real world with respect to a first reference frame;
   detecting, based on the output signals generated by the first sensor set, presence of one or more reference points in the first visual content defined by the first view information;
   receiving, from a second head-mounted device, (i) second heading information indicating a heading of the second head-mounted device determined based on output signals generated by a second heading sensor coupled to the second head-mounted device, and (ii) position information conveying position and heading of the second head-mounted device relative to at least two reference points physically present in the real world;
   determining, based on the position information conveying position and heading of the second head-mounted device relative to the at least two reference points, a calculated heading of the first heading sensor, wherein the calculated heading is a heading conveyed by the output signals of the first heading sensor while the first heading sensor is at the position and heading conveyed by the position information;
   determining a heading difference between the calculated heading and the heading of the second head-mounted device determined based on the output signals generated by the second heading sensor;
   effectuating presentation of views of augmented reality content through the first head-mounted device, wherein the augmented reality content is presented with respect to the heading of the first heading sensor; and
   responsive to the presentation of views of augmented reality content through the first head-mounted device, effectuating communication of the heading difference to the second head-mounted device, such that views of the augmented reality content presented through the second head-mounted device are presented with respect to the heading of the second heading sensor modified by the heading difference.

12. The method of claim 11, wherein determining the calculated heading comprises:
   determining, based on the presence of the at least two reference points in the first visual content defined by the first view information, the position of the first head-mounted device with respect to the at least two reference points;
   determining, based on the position information, a difference between the position of the first head-mounted device and the second head-mounted device with respect to the at least two reference points;

determining the calculated heading by modifying the heading of the first heading sensor by the difference between the position of the first head-mounted device and the second head-mounted device.

13. The method of claim 11, wherein the individual ones of the one or more reference points includes individual electromagnetic radiation beacons, including light beacons.

14. The method of claim 13, wherein the individual electromagnetic radiation beacons are identified by their individual wavelengths.

15. The method of claim 11, wherein an arrangement of the augmented reality content presented through the first head-mounted device is arranged with respect a first reference point or a second reference point; and the arrangement of the augmented reality content presented through the second head-mounted device is arranged with respect to the same reference point as the first head-mounted device.

16. The method of claim 11, wherein the second head-mounted device is configured to be installed on a head of a second user.

17. The method of claim 11, wherein the first head-mounted device includes a first client computing device coupled to the first head-mounted device, the first client computing device includes the first heading sensor, and the second head-mounted device includes a second client computing device coupled to the second head-mounted device, the second client computing device includes the second heading sensor.

18. The method of claim 11, wherein the augmented reality content is presented through the first head-mounted device and the second head-mounted device contemporaneously.

19. The method of claim 11, wherein the position information conveying position and heading of the second head-mounted device relative to the at least two reference points physically present in the real world is determined by a second sensor set of one or more sensors coupled to the second head-mounted device, the second sensor set being configured to generate output signals conveying second view information and second range information, the second view information defining second visual content within a second field of view, the second range information including ranges from the second head-mounted device to objects present within the second field of view.

20. The method of claim 19, wherein the method further comprises of:
  obtaining the output signals generated by the second sensor set;
  detecting, based on the output signals generated by the second sensor set, presence of the at least two reference points in the second visual content defined by the second view information; and
  determining, based on the presence of the at least two reference points in the second visual content defined by the second view information, the position information conveying position and heading of the second head-mounted device relative to the at least two reference points.

* * * * *